United States Patent Office 2,842,409
Patented July 8, 1958

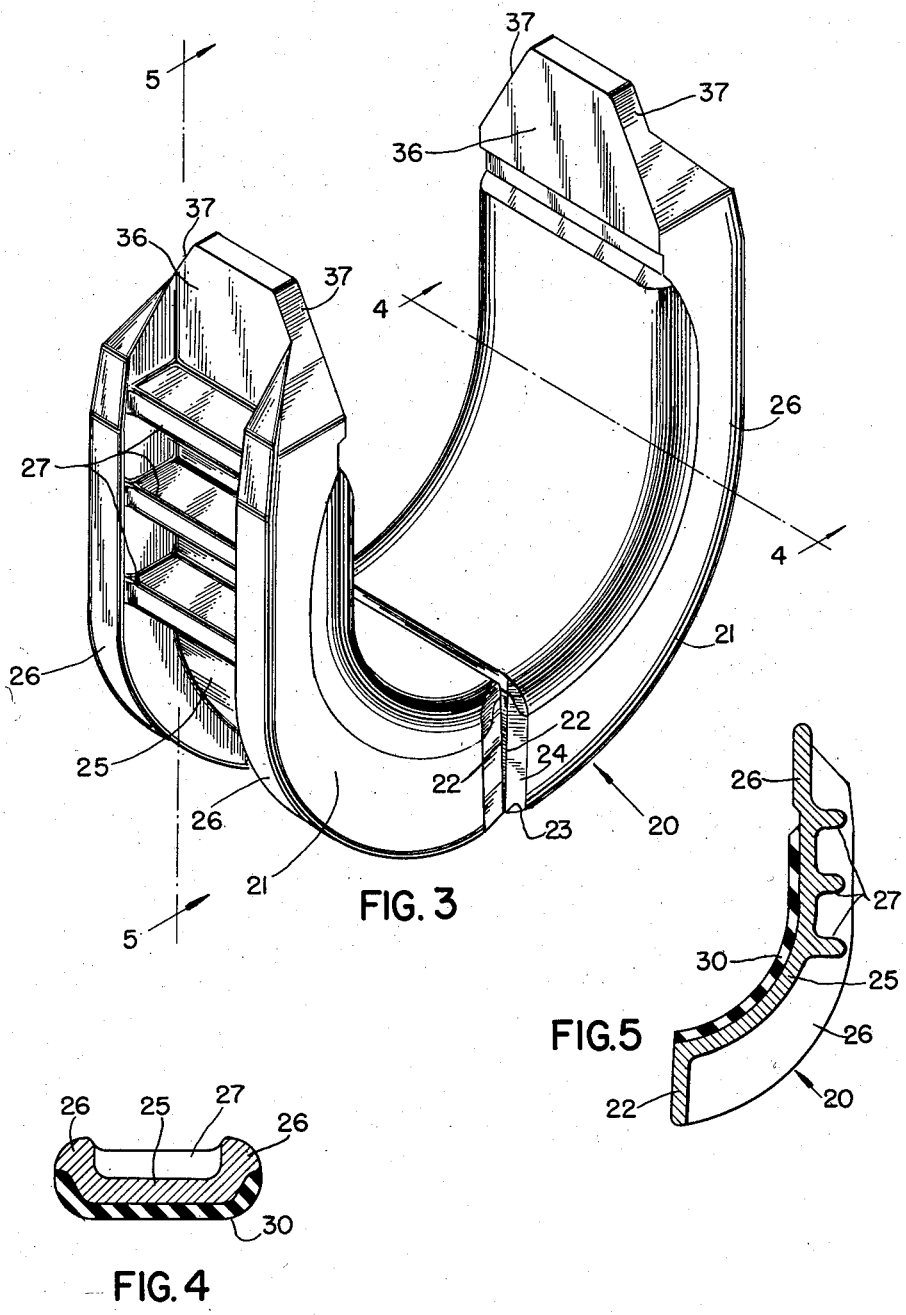

2,842,409
GUARD BEARINGS

Dan A. Christensen and Clifford A. Stephens, Palo Alto, Calif., assignors, by mesne assignments, to Federal-Mogul-Bower Bearings, Inc., Detroit, Mich., a corporation of Michigan Application December 21, 1954, Serial No. 476,678

7 Claims. (Cl. 308—38)

This invention relates to journal assemblies and more particularly to a new and improved guard bearing device for restricting the movement of the journal with respect to its housing in those designs where allowance must be made for considerable freedom of movement.

There are numerous instances where relative movement of the journal and housing are essential and to which the principles of this invention apply. However, the one to be described in detail below will serve as illustrative and as a guide for modifying the design for use in other housings having configurations differing from that shown here.

The present invention is generally similar to the guard bearing assembly disclosed in U. S. Patent 2,657,102, granted to Lloyd A. Johnson on October 27, 1953, but makes certain important improvements therein. Of particular importance is a new composite or laminated design making use of a heavy-duty cast metal main body and a thick layer of resilient non-metallic material bonded to its journal contacting surfaces. Thus, the main body is constructed of rugged heavy-duty material capable of absorbing the main brunt of the shock loads and to distribute them to other parts through wide area contact surfaces. At the same time, the non-metallic layer provides a resilient, tough cushion between the rotating journal and the main body of the guard.

Another feature of the new construction is the interchangeability of the guard members without sacrificing utility, efficiency, convenience of assembly and disassembly, or increasing the manufacturing cost.

Accordingly, it is a primary object of the present invention to provide a new and improved guard bearing assembly for restricting the relative movement of a journal and its housing, and particularly the type employed in railway truck assemblies.

Another object is the provision of a two-part guard bearing assembly wherein the parts are of identical design and shaped to interlock with portions of existing journal housings so as to be held assembled therein without the use of fastening devices of any kind.

Yet another object is the provision of a guard bearing of laminate construction including a bearing surface of resilient, non-metallic material highly resistant to abrasion, immune to deterioration in the presence of lubricants, and capable of withstanding repeated shock loads over a long period of time.

A further object is the provision of a laminate guard bearing having a cast metal main body and a resilient, non-metallic bearing layer bonded to its inner journal contacting surface capable of absorbing suddenly applied shock loads without chipping, cracking or permanent distortion, and serving to distribute the shock loads more uniformly to the main housing and the journal thereby eliminating or greatly minimizing the possibility of injury to either.

Yet another object is the provision of a journal guard bearing having a special journal contacting surface which can withstand much rough handling by unskilled labor during assembly in the field without danger of injury.

Still another object is the provision of a guard bearing of unusual ruggedness and efficiency at a minimum of cost.

Numerous other objects and advantages of the invention will become apparent in connection with the following detailed description of an illustrative embodiment of the invention taken with the accompanied drawings, wherein:

Figure 3 is an isometric view of the guard bearing members;

Figure 4 is a sectional view taken along line 4—4 on Figure 3; and

Figure 5 is a fragmentary sectional view through the lower end of one of the guard members taken along line 5—5 on Figure 1.

Figure 1:
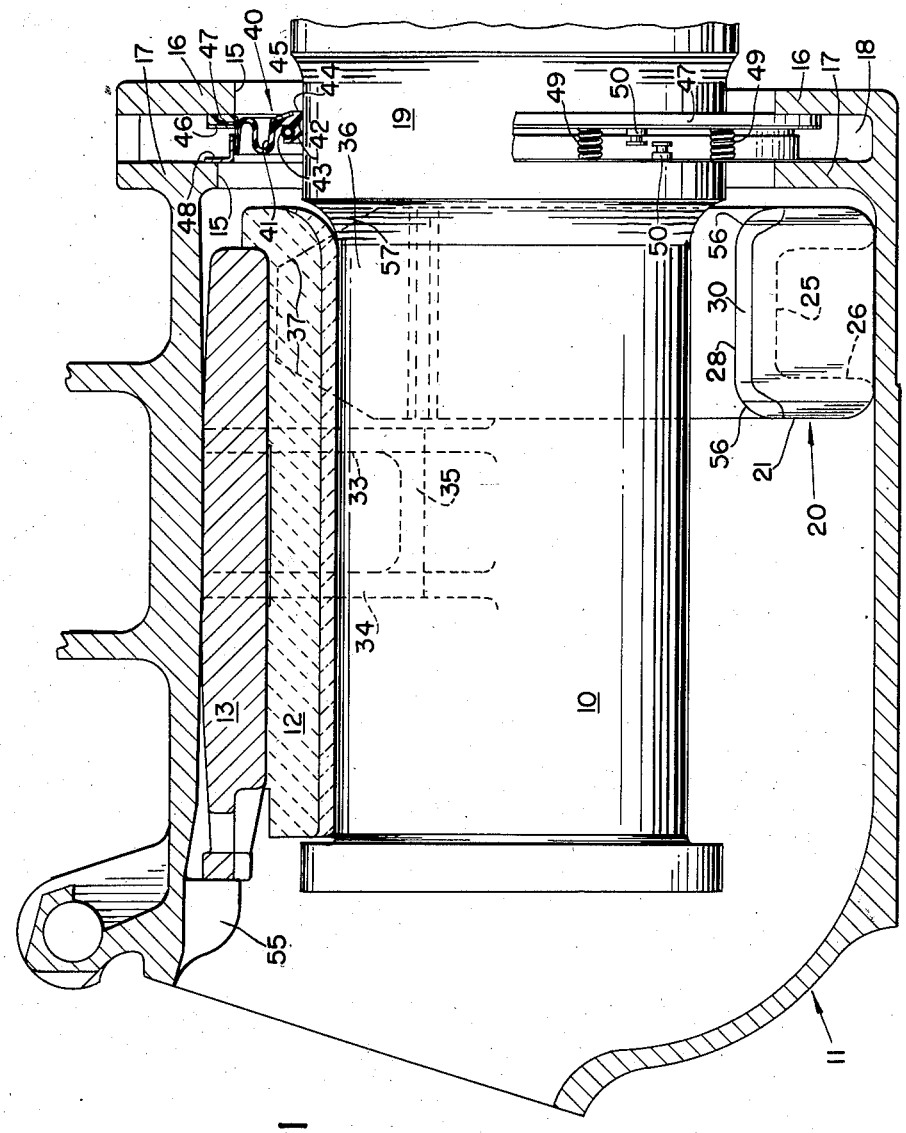
Figure 1 is a vertical sectional view through a railway truck journal assembly showing the guard bearing in assembled position.

Referring to the drawings, it will be noted that the guard bearing elements are shown assembled within a conventional railway truck journal of the type long in general use on freight cars. Since only the journal assembly is directly involved or required for an understanding of the invention, no other parts of the truck are illustrated here. It will, of course, be understood that the trunnion-like journal 10 projects from the outer face of one of the truck wheels. This journal is enclosed by a housing 11 supported from the top side of the journal by means of a brass 12 and a locking wedge 13. Each truck includes two pairs of wheels and two pairs of journals each of which has a journal housing. The housings on either side of a truck are interconnected by a side frame indicated at 14, and the car itself is supported on a bolster extending between and rigidly secured to the side frames of a given truck.

To permit the speedy assembly and disassembly of the housing with respect to the journal, as well as to accommodate the wide range relative movement of these elements, the journal extends into the housing through two large diameter aligned openings 15, 15 in the rear end walls 16 and 17. These walls are spaced a short distance from one another to provide a narrow but deep well 18 opening upwardly through the top side of the housing. This well, as originally designed and currently used by the railroad industry, customarily houses a loose fitting dust guard device embracing the sealing collar 19 integral with the rear end of the journal. Since this collar is considerably smaller in diameter than openings 15, it can shift vertically and laterally without striking the edges of the openings as the journal and housing shift with respect to one another. In actual practice, however, the radial spacing between the collar and the edges of the openings is inadequate to protect the collar from very severe shocks caused by sudden application of the brakes, switching operations, coupling of cars at excessive speeds and the like. The resulting injuries to the smooth surface of the collar so inconsistent with a proper seal with the guard device have defied solution so long that they have long been accepted as unavoidable. Therefore, it is not surprising that the common practice is to use inexpensive dust guards.

By the use of the unique guard bearing device constituting the present invention, however, it is impossible for the dust guard seat to ever contact the edges of openings 15 and it is now feasible to develop highly efficient sealing devices capable of operating for long periods while maintaining a fluid and dust-tight seal between the journal and its housing. In fact, an eminently satisfactory seal for this purpose is disclosed in U. S. Patent 2,657,080, granted to Lloyd A. Johnson et al. on October 27, 1953. The unique guard bearing assembly contributing greatly to the long life of an effective sealing device is illustrated in detail in the drawings and will now be described.

The guard bearing assembly per se, generally indicated by 20, preferably includes two identical members 21, 21 of generally arcuate shape but of channel shape in cross-section. The lower ends of the channels are closed by end walls 22, 22 having their faces inclined very slightly to the vertical when installed in the journal box with the lower rounded corners 23 in direct contact. The outer vertical corners of the end walls are also chamfered as indicated at 24 and serve as cams to facilitate the assembly of one past the other in the journal housing. As best shown in Figure 3, the channel-shaped guards include a web portion 25 inter-connecting two flanges or runners 26, 26. The upper mid-portion of the members may be strengthened between the runners by reinforcing ribs 27. The runners 26 are shaped to conform generally to the interior shape of the journal housing side walls but have two main contact areas, one being in the 6 o'clock position and the other in the 3 or the 9 o'clock position as viewed in Figure 2. This assures that thrust and impact loads imposed upon the bearings by the journal will be distributed between the two areas of the housing best suited by design to absorb these loads. Another important reason for having only an upper and a lower supporting point for each guard member is that the walls of the housing are formed by sand casting. Consequently, high spots are quite common. If these should be present beneath a flange of the guard radially opposite the area of impact by the journal, it is obvious that substantially the entire force of impact would be concentrated on the high spot and could result in fracture of the housing. Having two main support areas for each guard located to either side of the usual impact zone therefore assures distribution of the impact forces and greatly minimizes the adverse effects of high spots and irregularities in the inner walls of the housing.

Figure 2:
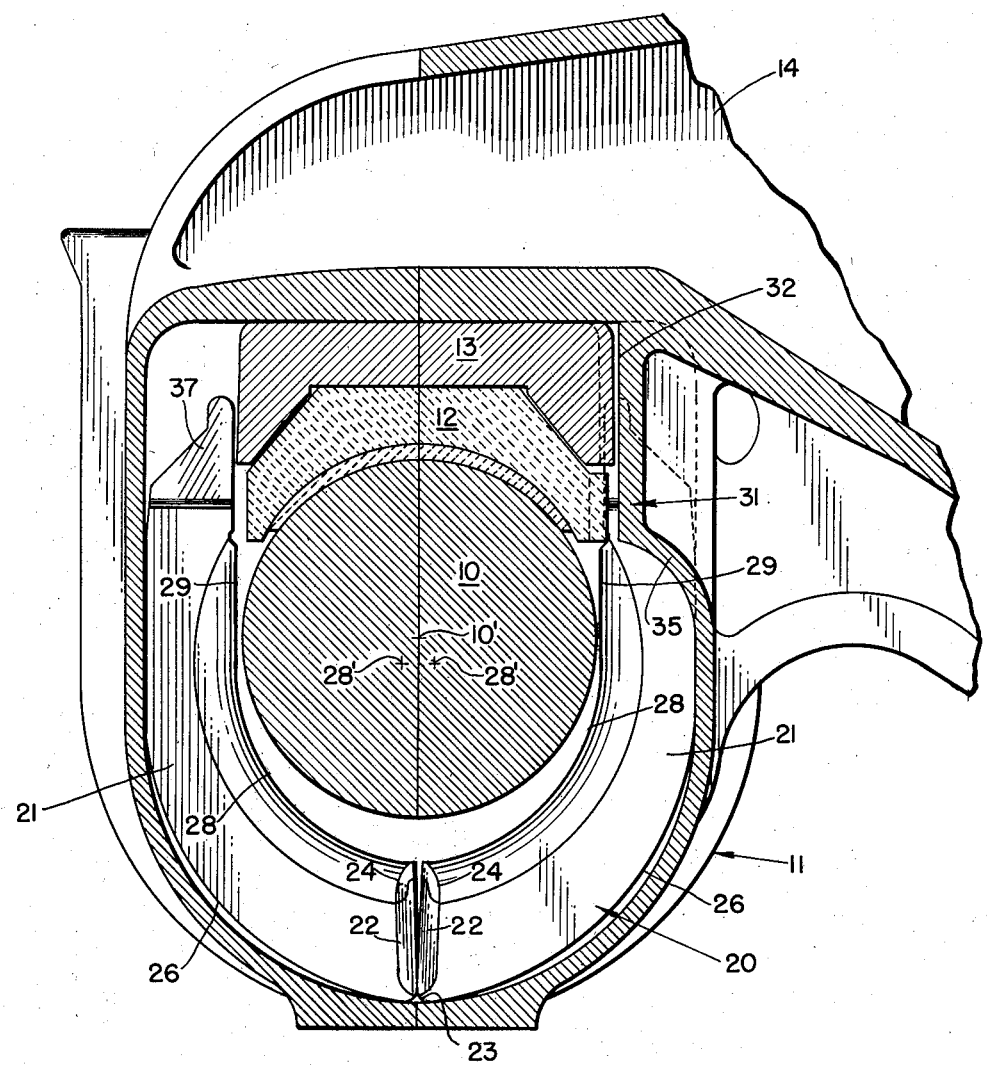
Figure 2 is a cross-sectional view through the journal box taken partly rearwardly of the bearing positioning lugs and partly forwardly thereof.

Figure 2 suggests that the curvature of the inner bearing surface 28 of the guard members differs materially from that of journal 10. However, this is not the case as the radius of the bearing surface is the same or slightly greater than that of journal 10 and appears greater only because its center point 28' is offset below and slightly laterally of journal axis 10'. Then too, the upper ends 29, 29 of surfaces 28, 28 are straight and extend tangentially from the upper end of a 90° arc. When the members 21, 21 are installed, ends 29, 29 are substantially vertical. There is little or no likelihood of contact between the journal and the surfaces of ends 29 since any tendency of the journal to shift laterally results in the journal being deflected downwardly at an angle to the horizontal by the curved bearing surface of member 12. Hence, the area of contact between the journal and surfaces 28 tends to be somewhat below the 4 and 8 o'clock positions on the guard members depending upon the direction of the impact.

An important feature of the invention is the provision of a special bearing material covering all those areas which can possibly be contacted by the journal. We have found that this material should have considerable resilience in order to distribute the force of impact over a wide area of both the bearing and the journal. The many advantages of this are manifest. Being resilient, the bearing material does not chip, crack or tend to scale. Since the impact is quickly and widely distributed, the heat of friction is generated over a large area of the bearing surface rather than concentrated in a relatively small area with manifest benefits. And of particular importance, the very great impact force is uniformly and equitably distributed over substantially the full surface of the bearing material thereby preventing non-uniform wear of the bearing material, or the imposition of very high frictional loads on a localized area of the bearing. And, of course, the advantages accruing to the bearing material are equally as beneficial to the journal itself.

We have found that a suitably compounded oil resisting type of synthetic rubber is highly satisfactory as the material for the bearing 30. This rubber compound should be highly resistant to attack by the lubricating medium, have a Shore A durometer hardness of 90 or higher, be capable of withstanding temperatures between $-40°$ F. and $250°$ F. without objectionable change in its properties, and particularly without becoming brittle at low temperatures or soft at higher temperatures. A very satisfactory bearing may also be made from an oil resistant synthetic rubber in combination with either a suitable thermoplastic or a suitable thermosetting resin. A specific example of the former is Buna N synthetic rubber blended with polystyrene resin, and an example of the latter is Buna N blended with a phenolic resin. Of course, as any person skilled in compounding rubber materials well knows, these constituents are mixed with small portions of suitable lubricants, antioxidants, accelerators and fillers to obtain stock material suitable for molding purposes in accordance with conventional practice.

Preferably, the layer of rubber bearing material 30 is firmly bonded to the inner surface of webs 25 and about the rounded lateral edges of the guard members in the manner clearly illustrated in Figures 3 and 4. This layer extends from the outer side of end wall 22 upwardly to a terminal point adjacent the lower lateral edge of journal bearing 12 as clearly shown in Figure 2. Although the main body of the guard members may be formed by welding the runners or flanges to the web portion, or by a stamping technique, it has been found most economical to cast them from steel or iron. The bearing supporting surfaces of the webs require no machining or finishing since the rough surface resulting from said casting provides an excellent surface to which the rubber bearing layers 30 may be bonded. Preferably, this surface is thoroughly cleaned to remove any oil or loose material as by sand blasting or other cleaning techniques. Thereafter, any suitable bonding agent is applied and the casting is placed in a rubber mold having one member shaped exactly like the desired finished surface of layer 30. The surface of this die member may be chrome plated to assure a highly polished smooth surface 28 on the finished product. The molding operation is, of course, carried on under high pressure as the uncured rubber stock is heated and cured. Thereafter, the member is removed from the mold. The only operation which remains to be performed is the removal of any rubber flashing at the mold joints and the finish grinding of any high areas on the main body of the casting.

There remains to be described another important feature of the design by reason of which the members are freely interchangeable with one another and the manner in which they interlock with portions of existing journal boxes for retention therein without reliance on any fastening or securing device. By reference to Figure 1, it will be seen that the guard members are located in the rear end of the oil reservoir portion of the journal housing and closely adjacent rear end wall 17. Substantially all journal boxes currently in use have lugs 31 projecting inwardly from the opposite sides of the box substantially mid-way of their length. The forward end walls 34 of these lugs provide abutments which cooperate with flanges projecting from the opposite sides of bearing brass 12 to limit the rearward movement of the brass along the top side of the journal. It should be noted that Figure 2 has been taken on two vertical planes offset from one another on the opposite halves of the journal housing. Thus the plane on the right half of Figure 2 passes through the inwardly extending lug 31, while the plane on the left half passes through the housing immediately rearward of the rear end wall 33 of the lug for clarity in the showing of the upper end of the left-hand guard bearing. It will, of course, be understood that the lugs 31 on either side of the journal housing are identical in shape and purpose and include an inner vertical side wall 32 cast integral with end walls 33, 34 and a lower bottom wall 35. The latter normally merges with the side wall of the journal housing at a point generally opposite the center line of journal 10.

From Figure 1, it will be noted that guard bearing members 21 have a width somewhat less than the distance between the rear end wall 33 of lug 31 and the inner journal housing end wall 17. The upper ends 36 of the guard members extend upwardly into this pocket between the lugs and the rear end wall for a sufficient distance to be locked against disassembly so long as the journal is in its normal operating position—i. e., so long as bearing 12 and wedge 13 are in their assembled positions as illustrated in Figure 2.

To facilitate the assembly of the guard members upwardly into the pocket just mentioned without regard to which lateral edge is facing the rear end wall of the journal housing, the opposite upper corners are cut away along surfaces 37, 37. This is one of the features which makes the members interchangeable with one another. This will become readily apparent from the description of the mode of assembling the guard members to the housing which will be made presently.

Before describing the mode of assembly, reference should be made to a preferred form of oil seal used in sealing the radial spacing between seating collar 19 and edges 15 of the openings through housing end walls 16 and 17. The seal proper generally designated 40, is identical with the design disclosed in United States Patent No. 2,657,080, granted to Lloyd A. Johnson et al. on October 27, 1953, and to which reference may be had for a detailed description. This seal includes a resilient, flexible, rubber bellows diaphragm 41. Formed integrally with the inner edge of this diaphragm is an inner oil sealing lip 42 held against collar 19 by a garter spring 43 and an outer dust lip 44 also seating against collar 19 and backed up by a dished metal washer 45.

Bonded to the outer periphery of the diaphragm is a cupped ring 46 having a soft rubber gasket 47 on its outer radial face. A second cupped ring 48 telescopes loosely over the axial flange of ring 46 and is urged axially away by a plurality of compression springs 49 having their opposite ends bearing against the radial flanges of rings 46 and 48.

A simple but effective means for holding the cupped rings assembled and compactly nested until fully installed comprises a plurality of pairs of grooved pins 50, 50 distributed along the radial flanges of the rings and adapted to lock the springs compressed when the heads of the pins are engaged, one behind the other. Unlocking is accomplished merely by reversely rotating rings 46 and 48 the slight amount required to disengage the heads of the pins, whereupon the springs are free to expand and anchor the rim of seal 40 between the opposite sides of well 18. And of particular importance, gasket 47 is pressed into fluid-tight engagement with outer wall 16.

From the foregoing, it will be readily apparent that the wide range movements of the journal relative to the housing when the guard bearing device 20 is not present would permit the sealing lip structure, or the bellows diaphragm, or both to become pinched and severed between collar 19 and the edges of openings 15. However, the presence of the guard bearing device provides a positive safeguard against this serious danger since the radial spacing between the journal and bearing surfaces 28 is substantially less than that between collar 19 and edges 15 of the opening through the end walls 16 and 17—and this is especially true at the sides of the journal as made clear by Figure 2.

The several parts are assembled in the following manner. The truck side frame 14 carrying journal housings 11 at its opposite ends is adjustably supported by jacks or a tackle block. The oil sealing device 40 locked in its axially collapsed position by pins 49 is dropped freely through the open top of well 18 and journal 10 is moved axially through the opening of the seal and partially into the journal housing. The housing is then lowered until its top wall rests against the flange at the front end of the journal to provide a maximum of free space between the journal and the bottom of the housing. Guard bearing members 21 are then individually inserted through the front access opening of the housing with end 36 pointed toward the rear end of the housing. End 36 is then fed upwardly into one of the rear corners of the box and about the lower rear edge of lug 31 until it is in its upright position. The second member is then installed in the other corner of the box in the same manner during which operation the beveled corners 24 at the abutting lower ends of the members will be most useful in guiding the ends past one another for self-apparent reasons.

Next, the journal is moved axially into its fully installed position as journal box 11 is elevated until the journal is fully nested and supported by the guard bearings to provide a maximum of clearance above the journal. Bearing 12 is then slid endwise over the flanged front end of the journal until it seats behind the flange. Locking wedge 13 is likewise slid into place over bearing 12 until its front end is behind the detent lug 55 carried by the top wall of the journal box. As soon as the box has been lowered onto the journal, the oil seal will move freely with the journal since it is still held collapsed. Making sure that the outer rim of the seal is concentric with collar 19, the operator inserts a tool through the top of well 18 and rotates rings 46 and 48 in opposite directions disengaging pins 50 and allowing springs 49 to expand firmly anchoring the rim of the seal between the opposite walls of well 18. This anchoring of rings 46 and 48 does not interfere with the free radial shifting of the sealing lips as permitted by the flexible bellows 41.

The fully assembled position of the journal in cooperation with the design of the various parts of the guard bearing members and the relationship of the same with lugs 31, 31 is such that it is impossible for the guards to rotate appreciably in either direction, nor to become displaced from their upright operating position. Nor are any fastening devices of any kind required other than that provided by the overlapping and abutting action of the loosely assembled parts relative to one another.

It should also be noted that the opposite lateral edges 56 of the bearing material on the guard members have identical curvatures which correspond with the curvature of fillet 57 connecting the surfaces of journal 10 and sealing collar 19. Hence, the axial shifting of the journal into contact with the guard bearings does not result in damage to either the fillet or the edge of the resilient bearing material. Moreover, since both edges of the guard are identical, the guards may be installed in either corner of the housing. This not only provides a foolproof safeguard against improper assembly by unskilled labor, but simplifies and lowers the cost of production, distribution and maintenance.

It will, of course, be understood that the lower part of the journal housing may be flooded with lubricant and that the latter may be fed to the journal in any suitable manner including cotton waste, pumps and other well-known devices. However, superior results are to be obtained by the use of a journal driven circulator of the type disclosed in the copending application for Letters Patent Serial No. 415,468, filed on March 11, 1954, now Patent No. 2,757,991, dated August 7, 1956, by Lloyd A. Johnson et al., and assigned to the same assignee as the present application. Such a circulator assures positive circulation of oil to all parts of the assembly including the oil seal and the bearing surfaces of the guard bearing members.

While only a single embodiment of the invention has been specifically illustrated and described, it will be quite apparent that various changes can be adopted without departure from the essential principles and teachings of the invention. For example, the guards need not be channel shaped in cross-section, nor need the resilient bearing material be bonded to the metal main bodies. Moreover, it is quite apparent that the metal main bodies may be formed by welding several components together.

We claim:

1. In a railway truck journal assembly of the type having a journal housing provided with a large diameter opening in its rear end wall for the reception of a journal, a truck journal extending through said opening into said housing, bearing means interposed between the top of said housing and the upper side of said journal, and a guard bearing interposed between the lower side of said journal and the adjacent interior walls of said housing for restricting the relative movement of said journal with respect to the housing, said guard bearing being generally U-shaped and having an inner arcuate bearing surface on the bight portion thereof normally out of contact with but closely spaced from the lower half of said journal, the improvement comprising an outer supporting surface of said guard bearing conforming generally to the configuration of the interior side and bottom walls of the journal housing but adapted to directly contact the same only at the lowermost end and at the opposite upper end portions of the legs of said device radially opposite the 3, 6 and 9 o'clock portions of said arcuate bearing surface, whereby the forces imposed by the cradling of the journal against the arcuate bearing surface of either side of the guard bearing are distributed by said guard bearing between the bottom and one of the side walls of the journal housing.

2. The combination defined in claim 1 wherein said U-shaped guard bearing device comprises a pair of identical interchangeable elements adapted to have their lower ends abut one another below the axis of the journal in mutually supporting relation, the abutting ends having their faces inclined very slightly to the vertical and outer vertical corners of the end faces being chamfered.

3. The combination defined in claim 2 wherein the opposite side corners at the ends of the legs of said U-shaped guard bearing device, one on each said identical element, are cut off along upwardly converging planes to facilitate assembly and disassembly of the device with respect to a journal housing without regard to which lateral edge of the device faces the rear end wall of the housing and without regard to which element is inserted in which side.

4. A railway truck journal assembly including in combination a journal; a housing enclosing an end of said journal and supported on the top side of said journal through a plate-like bearing assembly, said housing being adapted to pivot, slide, and twist through limited ranges relative to said journal, said housing having bottom, side, and end walls and lugs projecting inwardly from the upper mid-portions of its opposite sides, each said lug having a vertical wall generally parallel to and adjacent said end wall; and a generally U-shaped guard bearing device loosely supported in said housing between the bottom and side walls thereof and the lower side of said journal, said guard bearing device comprising a pair of identical generally J-shaped members and having a wide-area bearing surface normally spaced close to but out of contact with the journal and being operable to restrict the relative movement between said journal and said housing, the upper end of each said member having an upwardly extending leg projecting into an upper corner of said housing between a vertical wall of said lug and said adjacent end wall of said housing, the upper end of each said leg overlapping said vertical lug wall sufficiently to lock said guard bearing device against removal from its assembled operating position so long as said plate-like bearing assembly is positioned between the top of said housing and the top side of said journal.

5. The structure defined in claim 1, wherein the guard bearing comprises a main body of cast metal and wherein the inner arcuate bearing surface thereof includes a resilient nonmetallic bearing layer firmly bonded to the arcuate inner surface, said layer having a smooth cylindrical exterior surface for direct contact with said journal, whereby said metal body supplies the needed rigidity for supporting said journal when said journal engages said guard bearing member and whereby said bearing layer cushions the journal from the shock of such engagement without damage to itself, distributes the shock loads relatively uniformly to said body, and prevents the surface of said journal from being scored or roughened by contact with said guard bearing.

6. The guard bearing member of claim 5, wherein said bearing layer is formed from a homogeneous mixture of a reinforcing resin and an oil resisting synthetic rubber, said bearing layer having a Shore A durometer hardness not substantially less than 90.

7. The guard bearing member of claim 6 wherein said layer is formed from oil-resistant synthetic materials and has a Shore A durometer hardness of at least 90.

References Cited in the file of this patent

UNITED STATES PATENTS

| | | |
|---|---|---|
| 1,667,992 | Sherwood | May 1, 1928 |
| 2,397,124 | Buffington et al. | Mar. 26, 1946 |
| 2,605,248 | Fisk | July 29, 1952 |
| 2,657,102 | Johnson | Oct. 27, 1953 |
| 2,690,934 | Holcombe | Oct. 5, 1954 |